United States Patent
Hayashi et al.

[11] Patent Number: 6,164,335
[45] Date of Patent: Dec. 26, 2000

[54] MANIFOLD SOLENOID VALVE DRIVEN BY SERIAL SIGNALS

[75] Inventors: Bunya Hayashi; Fumio Morikawa; Katsuhisa Endo, all of Tsukuba-gun, Japan

[73] Assignee: SMC Corporation, Tokyo, Japan

[21] Appl. No.: 09/523,649

[22] Filed: Mar. 10, 2000

[30] Foreign Application Priority Data

Mar. 31, 1999 [JP] Japan .................................. 11-093582

[51] Int. Cl.[7] .................................................. F16K 31/04
[52] U.S. Cl. .......................................... 137/884; 137/269
[58] Field of Search ..................................... 137/884, 269

[56] References Cited

U.S. PATENT DOCUMENTS

| | | | |
|---|---|---|---|
| 5,458,048 | 10/1995 | Hohner | ......................................... 91/459 |
| 5,699,830 | 12/1997 | Hayashi et al. . | |
| 5,887,623 | 3/1999 | Nagai et al. | .............................. 137/884 |
| 5,915,666 | 6/1999 | Hayashi et al. . | |
| 5,918,629 | 7/1999 | Hayashi et al. . | |

*Primary Examiner*—John Fox
*Attorney, Agent, or Firm*—Oblon, Spivak, McClelland, Maier & Neustadt, P.C.

[57] ABSTRACT

In a manifold solenoid valve drive-controlled by serial signals, a solenoid valve itself is provided with a function for receiving serial signals for single valves or double valves so as to simplify assembly and replacement of the manifold solenoid valve. For this purpose, in order to transmit serial signals to solenoid valves through manifold blocks 30 on which solenoid valves 20 are mounted and which are connected, each manifold block 30 is provided with female/male connecting terminals 46a and 46b for transmitting serial signals and a connector 49 for transmitting drive control serial signals to the solenoid valves 20 and supplying drive power for switching a main valve 22. A connector 25 for transmitting and receiving power that is connected to the connector 49 when the solenoid valve 20 is mounted is provided at a position matched to the connector 49 of the manifold block. The solenoid valve 20 is provided with a slave chip 28 that extracts operation signals for solenoid valves from serial signals received through the connectors.

3 Claims, 7 Drawing Sheets

MANIFOLD SOLENOID VALVE DRIVEN BY SERIAL SIGNALS

FIELD OF THE INVENTION

The present invention relates to a manifold solenoid valve drive-controlled by serial signals and, more particularly, to a manifold solenoid valve driven by serial signals that employs a transmission circuit for serial signals or the like in a manifold block, which transmission circuit is commonly used regardless of whether a solenoid valve mounted on the manifold block is a single solenoid valve or a double solenoid valve, the solenoid valve itself being provided with a function for receiving serial signals for a single solenoid valve or a double solenoid valve.

DESCRIPTION OF THE RELATED ART

Conventionally, a manifold solenoid valve provided with a required number of solenoid valves, manifold blocks on which the solenoid valves are individually mounted and are interconnected, and an air supply/exhaust block that supplies and exhausts compressed air through the manifold blocks has been extensively used. The solenoid valves mounted on the manifold blocks generally come in single solenoid valves (normally three-port valves: hereinafter referred to simply as "single valves") in which a passage of a main valve is switched by a single solenoid, and double solenoid valves (normally five-port valves: hereinafter referred to simply as "double valves") in which a passage of a main valve is switched by two solenoids.

In the manifold solenoid valve, the respective solenoid valves mounted thereon can be drive-controlled by serial signals. In this case, however, the number of driven solenoids differs depending upon whether the solenoid valves are single valves or double valves, so that a control system has to be adapted to either of them. Furthermore, any of the solenoid valves respectively mounted on a plurality of manifold blocks consecutively connected are sometimes changed between single valves and double valves, so that the control system that controls the solenoid valves must be changed or switched accordingly.

Such a solenoid valve control system is generally provided in a signal transmission circuit in a manifold block. In this case, it is necessary to place a predetermined control system in a manifold block according as whether a solenoid valve mounted on the manifold block is a single valve or a double valve. Furthermore, changing solenoid valves mounted on manifold blocks between single valves and double valves involves disassembling consecutively connected manifold blocks in order to change or switch control systems therein; it cannot be accomplished simply by changing the solenoid valves.

DISCLOSURE OF THE INVENTION

A technological object of the present invention is to provide a manifold solenoid valve driven by serial signals in which a solenoid valve itself is provided with a function for receiving serial signals in a single valve mode or a double valve mode when serial signals are transmitted through manifold blocks in controlling drive of such a manifold solenoid valve by serial signals so as to simplify assembly of the manifold solenoid valve.

Another technological object of the present invention is to make it possible to use a common transmission circuit for serial signals or the like within a manifold block regardless of whether a solenoid valve mounted on the manifold block is a single valve or a double valve to thereby simplify assembly of a manifold solenoid valve and provide a manifold solenoid valve driven by serial signals that permits an easier change of a solenoid valve mounted on the manifold block.

Still another technological subject of the present invention is to provide a manifold solenoid valve driven by serial signals that employs a control system for a solenoid valve that can be switched and set between a single valve mode and a double valve mode, and the control system is configured so that it is switched to adapt itself for a solenoid valve while it is mounted on the manifold block, or able to automatically adapt itself for the solenoid valve when the control system is mounted on the manifold block.

A manifold solenoid valve in accordance with the present invention for fulfilling the aforesaid objects is applied to a manifold solenoid valve that comprises a required number of solenoid valves and manifold blocks on which the solenoid valves are individually mounted and which are interconnected, supplies and exhausts compressed air to and from the respective solenoid valves through the manifold blocks, and transmits serial signals for operation control through the manifold blocks to control operations of the solenoid valves by the serial signals, wherein female and male connecting terminals for transmitting serial signals to and from the manifold blocks consecutively connected are provided and projected to openings in top surfaces of the manifold blocks, solenoid valves are provided with transmission and power supply connectors for transmitting serial signals for controlling the drive of the solenoids and for supplying drive power for switching a main valve, transmission and power receiving connectors that are connected to the transmission and power supply connectors when the solenoid valves are mounted are provided at positions corresponding to the transmission and power supply connectors of the solenoid valves mounted on the manifold blocks, and the solenoid valves are provided with slave chips that extract operation signals for the solenoid valves from serial signals received through the connectors.

In the manifold solenoid valve described above, a slave chip that can be switched and set between the single valve mode and the double valve mode is employed, the solenoid valves can be provided with changeover switches for switching and setting them, or the connectors for single valves and double valves can be formed to have a connection structure wherein serial signals are transmitted for single valves or double valves.

In the manifold solenoid valve driven by serial signals that has the configuration set forth above, each manifold block is provided with the female and male connecting terminals for transmitting serial signals to the solenoid valves and the connectors for transmitting serial signals and supplying power for driving a main valve, a transmission circuit for serial signals or the like in the manifold block that is commonly used for single valves and double valves is used, and the solenoid valve itself provided with a function for receiving serial signals in the single valve mode and the double valve mode. Hence, in assembling the manifold solenoid valve, there is no need to adapt the serial signal transmission circuit in the manifold block to the solenoid valve regardless of whether the solenoid valve mounted on the manifold block is a single valve or a double valve, thus permitting easier assembly of the manifold solenoid valve and also easier change of the solenoid valve mounted on the manifold block.

Moreover, as the control systems for solenoid valves, the ones that can be switched and set between the single valve mode and the double valve mode are employed, and the control systems are configured so that they may be switched by switches to adapt themselves to the solenoid valves while they are mounted on the manifold blocks or may be automatically adapted to the solenoid valves by the connectors when the control systems are mounted on the manifold blocks. The control systems can be easily adapted to solenoid valves, and a manifold solenoid valve that permits various types of maintenance to be performed easily and has a simple structure can be obtained.

DETAILED DESCRIPTION

Figure 1:
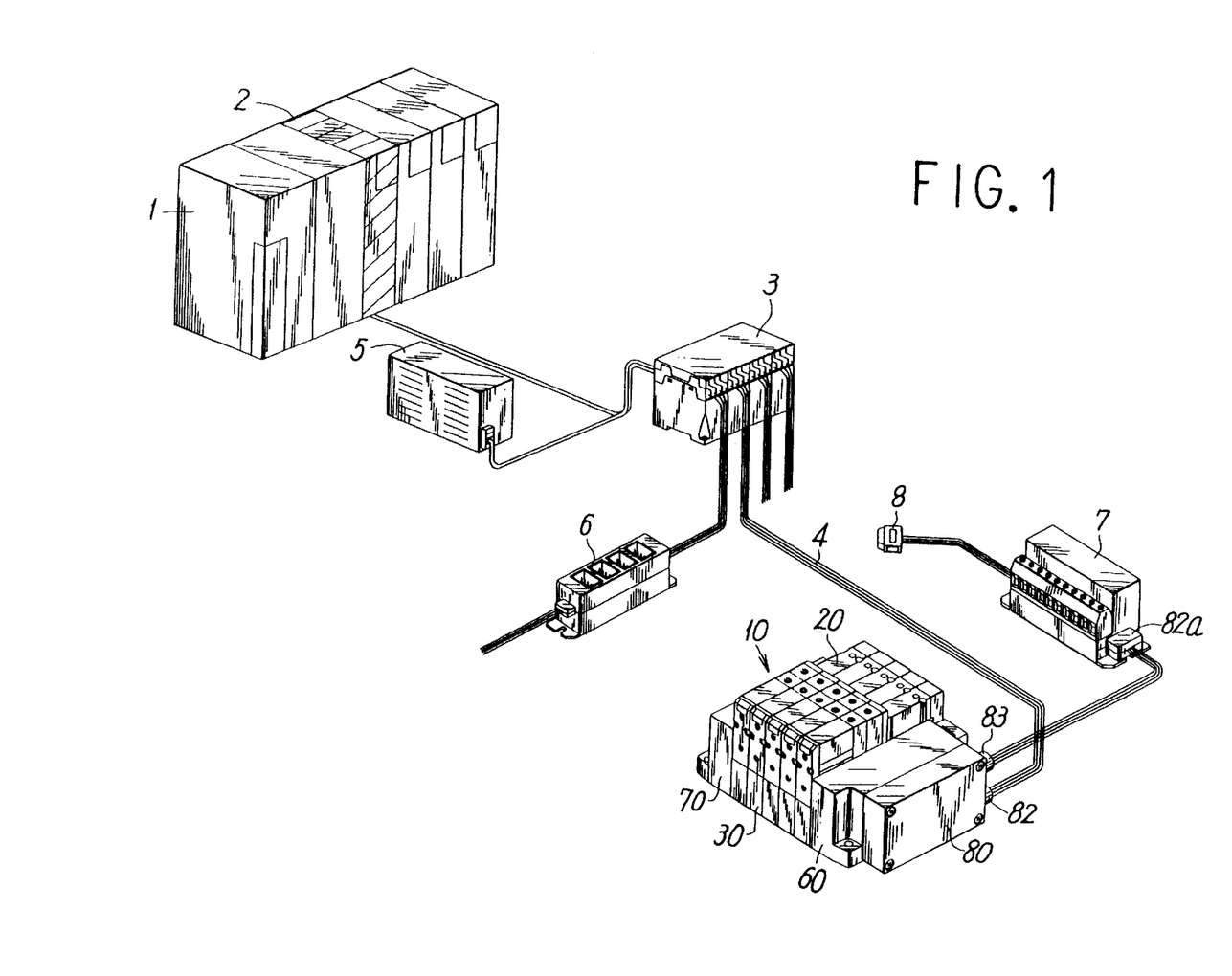
FIG. 1 is a perspective view showing an exemplary configuration of a control system for driving a manifold solenoid valve in accordance with the present invention by serial signal.

FIG. 1 shows an exemplary configuration of a control system for driving a manifold solenoid valve in accordance with the present invention by serial signals.

In the control system, serial signals are transmitted from aserial communication unit 2, an operation of which is controlled by a control unit 1, through a dedicated cable 4 via a gateway 3, to a manifold solenoid valve 10 and other equipment via a connector 6 as necessary. Drive power from a power unit 5 can be supplied together with the foregoing serial signals transmitted through the gateway 3 or supplied separately therefrom. An end unit 8 can be connected to the manifold solenoid valve 10 after connecting an analog device 7 or the like as necessary.

Figure 2:
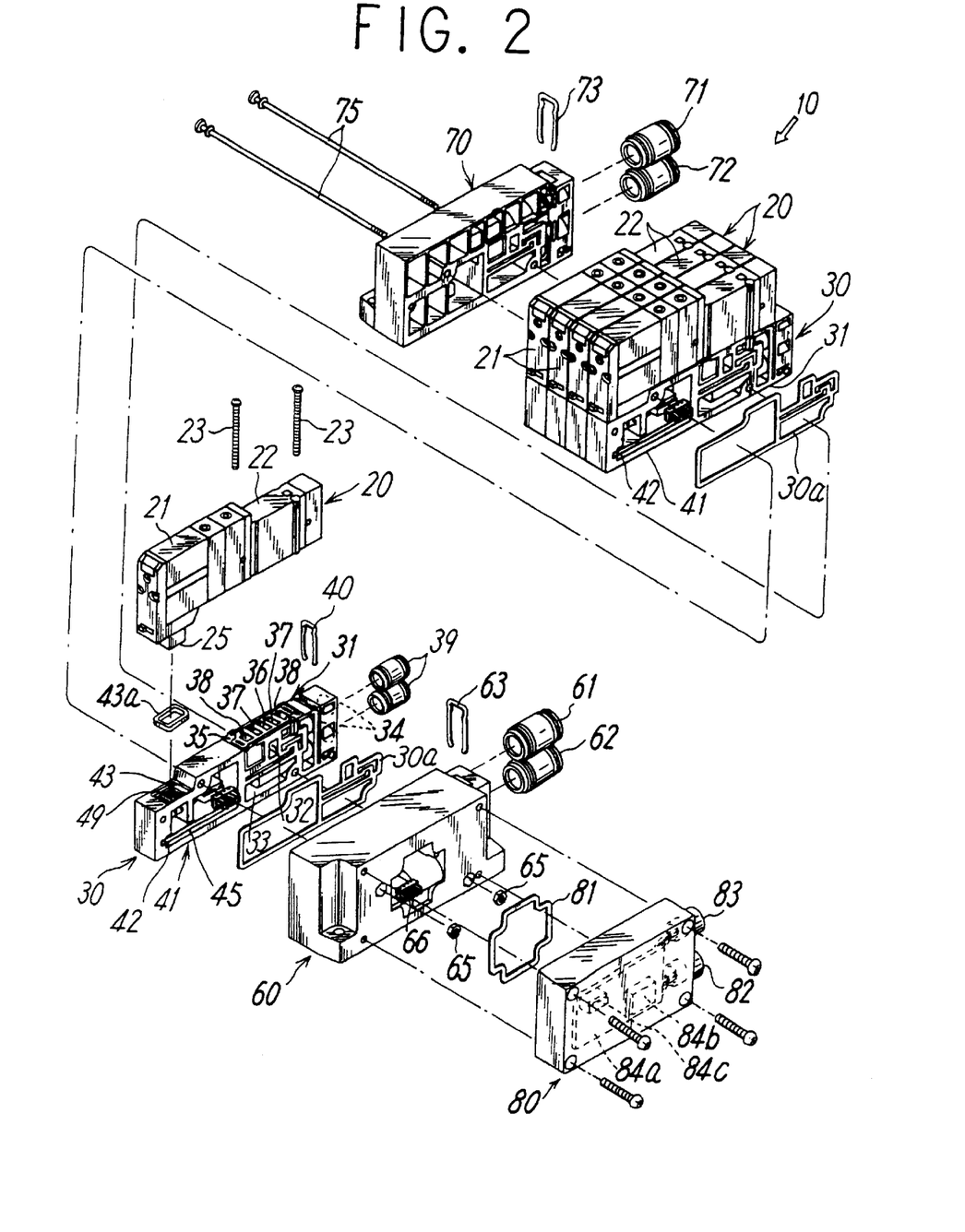
FIG. 2 is an assembly view showing an embodiment of the manifold solenoid valve in accordance with the present invention.

FIG. 2 shows an embodiment of the manifold solenoid valve 10 in accordance with the present invention, an operation of which is controlled by the foregoing serial signals.

The manifold solenoid valve 10 is equipped with solenoid valves 20 composed of three-port single valves or five-port double valves in a quantity required for various applications, a required quantity of manifold blocks 30 on which the solenoid valves 20 are individually mounted and which are interconnected, a supply/exhaust block 60 which is provided at one end of the connected manifold blocks 30 and which supplies and exhausts compressed air through the manifold blocks 30, an end block 70 provided at the other end of the connected manifold blocks 30, and a relay unit 80 which is attached to the supply/exhaust block 60 and which relays serial signals for operation control to be sent to the respective solenoid valves 20 from the gateway 3 through the manifold blocks 30.

Figure 3:
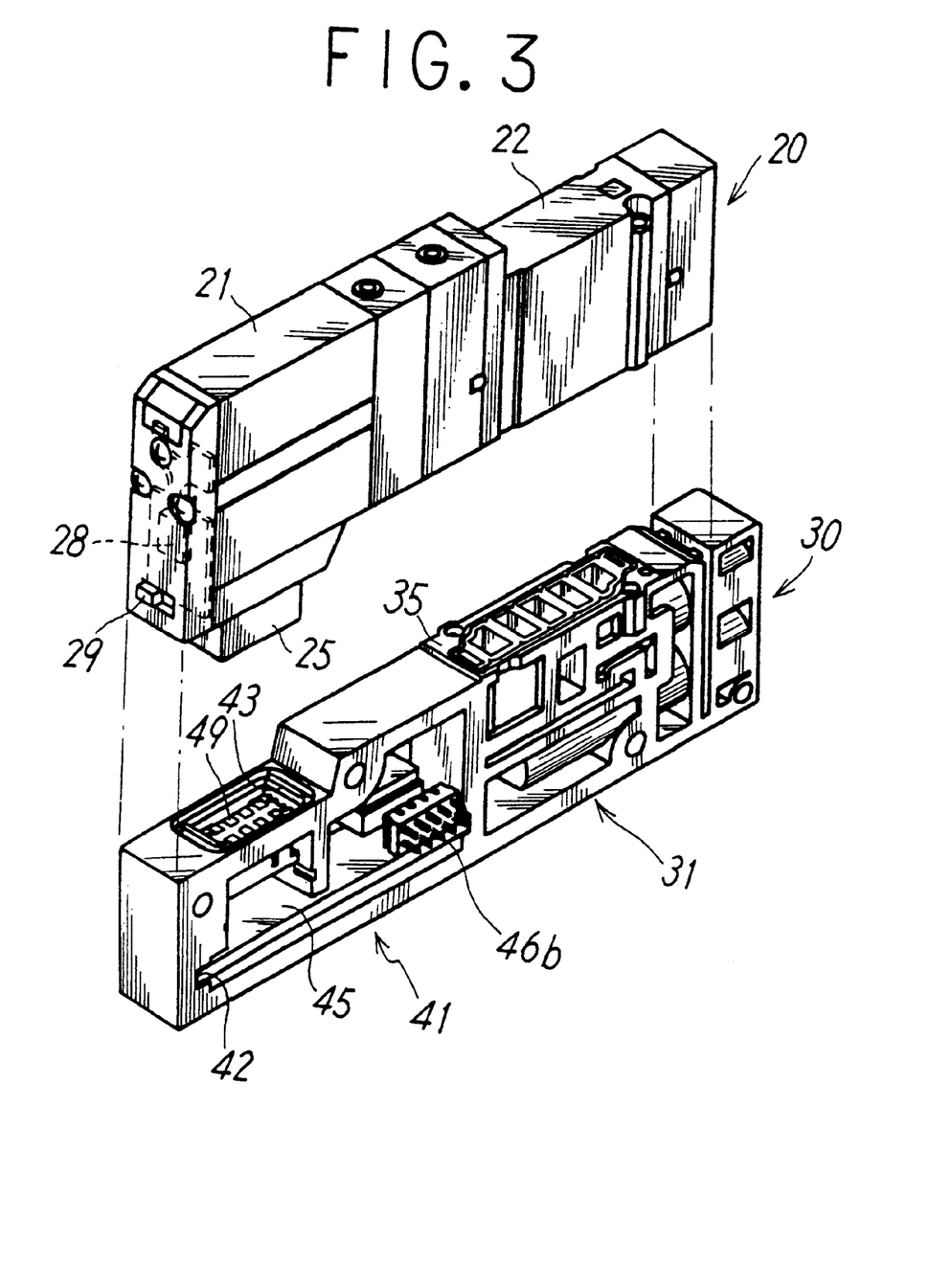
FIG. 3 is an assembly view showing a relational configuration of a manifold block and a solenoid valve in the above embodiment.

The solenoid valve 20 is, as shown in FIG. 2 and FIG. 3, equipped with a single or a plurality of solenoids therein, and drives a three-port or five-port main valve 22 via a pilot valve 21, which is electromagnetically driven by the solenoids, or directly by the solenoids to thereby switch between air supply and exhaust in the main valve 22. The solenoid valve 20 is secured onto the manifold block 30 by mounting screws 23. The solenoid valve 20 is provided with a connector 25 for transmitting and receiving power that is electrically connected to a connector 49 for transmitting and supplying power, which will be discussed hereinafter, when it is fixed on the manifold block 30, and electrically connected to a slave chip 28 which accommodates the connector 25 and which will be discussed hereinafter. The slave chip 28 is adapted so that it can be switched and set between a single valve mode and a double valve mode. The solenoid valve is provided with a changeover switch 29 for switching and setting the slave chip 28 between the single valve mode and the double valve mode.

The solenoid valves 20 employ common manifold blocks 30 regardless of whether the solenoid valves 20 are of the three-port or five-port type, so that they can be constructed to have the same external shape, being different only in internal mechanism. The single valve and the double valve may have a necessary structural difference as long as it does not interfere with their installation on the manifold blocks 30.

The manifold block 30 is provided with a fluid passage section 31 and an electric circuit section 41. The two sections 31 and 41 may be formed into one piece by a synthetic resin or the like, or may be separately formed and then combined into one piece.

A passage provided in the fluid passage section 31 of the manifold block 30 is comprised primarily of, as in the case of a well-known manifold block, a common passage 32 for air supply and a common passage 33 for exhaust which penetrate the manifold blocks 30 to establish mutual communication with a passage (not shown) in the supply/exhaust block 60, and output passages that supply and discharge an output fluid from the solenoid valves 20 to two output ports 34 and 34 provided in one end surface of the manifold block 30. As necessary, a passage for supply and discharge for a pilot valve is additionally provided. Furthermore, a supply channel 36, output channels 37, exhaust channels 38, etc. for establishing communication between the common passages and the output passages, or the passage for supply/discharge for a pilot valve and supply/discharge openings provided in a mounting surface of the manifold block 30 in the solenoid valve 20 are provided in a solenoid valve mounting surface 35 at a top.

Output port couplers 39 and 39 attached to the output ports 34 and 34 are provided with locking grooves around themselves. The locking grooves are fitted in the output ports 34 and 34 of the manifold block 30, and legs of a U-shaped pin 40 inserted from above the manifold block 30 are engaged with the locking grooves for a securing purpose.

The embodiment described above is based on an assumption that the solenoid valve 20 is provided with two solenoids that are five-port double valves. If the five-port double valves are replaced by three-port single valves, then one solenoid, output port, etc. are rendered effective, while the other one that is unnecessary is rendered ineffective or omitted.

Figure 4:
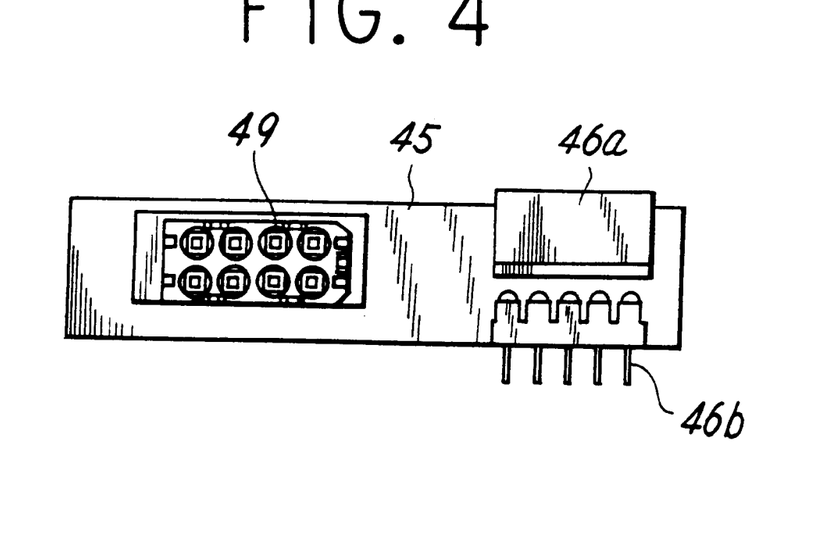
FIG. 4 is a top plan view showing an exemplary configuration of a printed circuit board mounted on the manifold solenoid valve.
Figure 5:
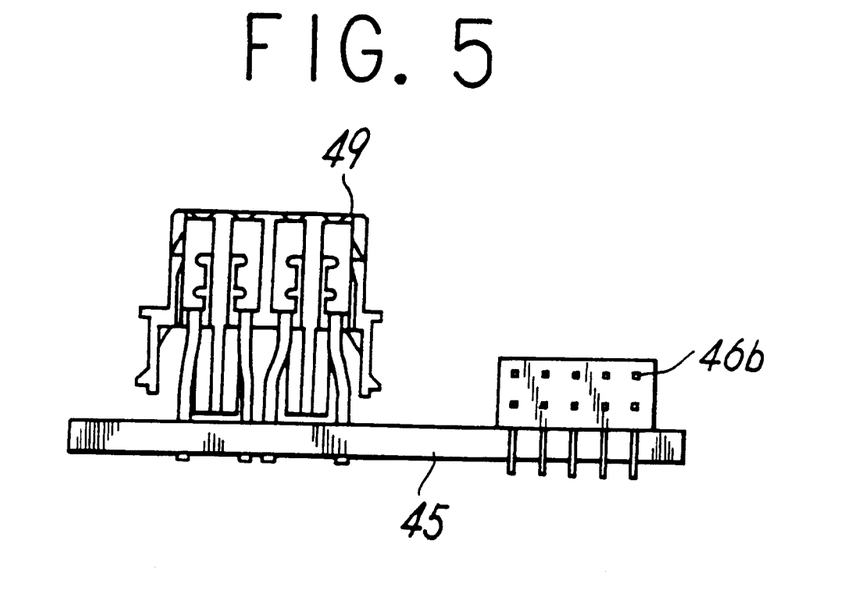
FIG. 5 is a side view of the printed circuit board mounted on the manifold solenoid valve shown in FIG. 4.

In the electric circuit section 41, as shown in FIG. 4 and FIG. 5, female/male connecting terminals 46a and 46b for transmitting serial signals to and from consecutively connected manifold blocks, and the transmission and power supply connector 49 for transmitting drive control serial signals to the solenoid valves 20 and supplying drive power for switching a main valve 22 are provided on the printed circuit board 45, and are electrically interconnected by printed wiring on the printed circuit board 45 such that signals from the connecting terminal 46b are transmitted to the slave chip 28 of the solenoid valve 20 through the connector 49 and further transmitted from the connecting terminal 46a to an adjoining manifold block 30. The printed circuit board 45, the connecting terminals 46a and 46b, and the connector 49 are commonly used regardless of whether the solenoid valve 20 mounted on the manifold block 30 is a single valve or a double valve.

A mounting groove 42 for the printed circuit board 45 is provided in the electric circuit section 41 of the manifold block 30 as shown in FIG. 2 and FIG. 3., so that the printed circuit board 45 provided with the female and male connecting terminals 46a and 46b and the transmission and power supply connector 49 is fitted and secured in the mounting groove 42 to be thereby installed in a predetermined position. It is suited for the printed circuit board 45 to be fixed by screws or the like, or stably and detachably fixed by, for example, providing it with a member that elastically engages with the mounting groove 42 when the printed circuit board 45 is inserted in a predetermined position of the mounting groove 42. A flexible circuit board may be used for the printed circuit board 45.

The female and male connecting terminals 46a and 46b on the printed circuit boards 45 in the adjoining manifold blocks 30 are disposed back-to-back at opposing plate edges on the printed circuit boards 45. Thus, when the printed circuit board 45 is fitted in the predetermined position, the female and male connecting terminals 46a and 46b are provided outwardly at predetermined positions of a surface where the manifold blocks 30 are interconnected. When adjoining manifold blocks 30 are connected at the surface where they are joined to one another by the positioning, the female and male connecting terminals 46a and 46b in the adjoining manifold blocks 30 are interconnected as soon as the common passages 32 and 33 in the manifold blocks 30 are communicated with one another. Alternatively, the connecting terminals 46a and 46b may be fixedly provided at predetermined positions in the manifold block 30.

An opening 43 for a connector 49 is provided in a top surface of the electric circuit section 41 in the manifold block 30, and the connector 49 on the printed circuit board 45 is jutted out to the opening 43. The connector 49 may be fixedly provided on the printed circuit board 45, or semi-fixedly provided to permit positional adjustment by installing it via a member that is flexible to a certain extent, or connected via a flexible lead wire connected at a predetermined position of the printed circuit board 45, provided that the connector 49 is disposed at a position where it projects to the opening 43 when the printed circuit board 45 is fitted at a predetermined position of the mounting groove 42 in the electric circuit section 41, or the connector 49 is disposed at a position where it faces the opening 43 and fixed there by an appropriate means.

Thus, by providing the connector 49 at a position where it faces the opening 43 in the top surface of the manifold block 30, the connector 49 is disposed at the predetermined position on the manifold block 30. More specifically, when the solenoid valve 20 is mounted on the solenoid valve mounting surface 35 on the manifold block 30 via a gasket, and the supply/discharge opening provided in the solenoid valve 20 is communicated with the supply channel 36, the output channel 37, the exhaust channel 38, etc. opened in the fluid passage 31, the connector 49 is disposed at the position where it is interconnected with the transmitting and power receiving connector 25 provided on the solenoid valve 20. When the connector 49 and the connector 25 are connected, a connector gasket 43a is placed around the opening 43 to seal the electrically connected portion.

A plurality of the manifold blocks 30 described above are connected. The supply/exhaust block 60 for supplying and exhausting compressed air through the connected manifold blocks 30 is provided at one end of the connected manifold blocks 30 and the end block 70 is provided at the other end.

The supply/exhaust block 60 is provided with an air supply coupler 61 and an exhaust coupler 62 on its one end surface. The air supply coupler 61 and the exhaust coupler 62 are communicated with the common passage 32 for air supply and the common passage 33 for exhaust that penetrate the respective manifold blocks 30 to supply air from outside to the common passage 32 and air from the respective solenoid valves 20 is exhausted through the common passage 33. The supply/exhaust couplers 61 and 62 are fixed by engaging legs of a U-shaped pin 63 inserted from above the supply/exhaust block 60 with locking grooves provided around peripheries of the couplers 61 and 62, as in the case of the output port coupler 39 mentioned above. Although not shown, a surface of the supply/exhaust block 60 where it is joined to the manifold block 30 is provided with a female connecting terminal connected to the male connecting terminal 46b provided on the manifold block 30, and a male connecting terminal 66 electrically connected therewith is further provided on an outer surface of the block 60.

The end block 70 is positioned at either end of the manifold blocks 30 consecutively installed together with the supply/exhaust block 60, and they are connected by tension bolts 75 and fixing nuts 65. The end block 70 also closes ends of the common passages 32 and 33, etc. provided such that they penetrate the manifold blocks 30. At the time of connection, gaskets 30a are installed between the respective manifold blocks 30 and between the manifold block 30, the supply/exhaust block 60, and the end block 70 so as to individually seal the fluid passage section 31 and the electric circuit section 41 in the manifold block 30. The gaskets 30a may be installed, taking the fluid passage section 31 and the electric circuit section 41 as discrete units in the manifold block 30.

In the end block 70, a supply coupler 71 and an exhaust coupler 72 can be provided in addition to the supply coupler 61 and the exhaust coupler 62 in the supply/exhaust block 60. In this case also, the two couplers 71 and 72 are fixed using a U-shaped pin 73 inserted from above the end block 70. Although not shown, the end unit 8 (refer to FIG. 1) can be accommodated in the end block 70.

A relay unit 80 attached to the supply/exhaust block 60 via a gasket 81 in a sealed state relays serial signals for operation control from the gateway 3 to be sent to the respective solenoid valves 20 through the manifold blocks 30, and functions to receive and transmit the serial signals. The relay unit 80 is equipped with serial signal connecting terminals 82 and 83 for receiving and transmitting. In the relay unit 80, a required electric or electronic component 84*b* and a female connecting terminal 84*c* for transmitting serial signals that is connected to the male connecting terminal 66 in the supply/exhaust block 60 are provided on a printed circuit board 84*a*. The relay unit 80 may be installed to one or both of the supply/exhaust block 60 and the end block 70, and may be formed integrally with the supply/exhaust block 60 or the end block 70.

The solenoid valve 20 is basically composed of a single valve or a double valve. The solenoid valve 20 shown in FIG. 3, however, is provided with the changeover switch 29 for switching and setting the slave chip 28 between the single valve mode and the double valve mode. This switch is used also for switching the slave chip 28 since the slave chip 28 is adapted to be used for both the single valve mode and the double valve mode. The switch is adapted so that it can be changed over by hand externally so as to allow effective use when the solenoid valve can be used as a single valve and a double valve by switching, as in the case of a solenoid valve 90 illustrated in FIG. 6.

Figure 6:
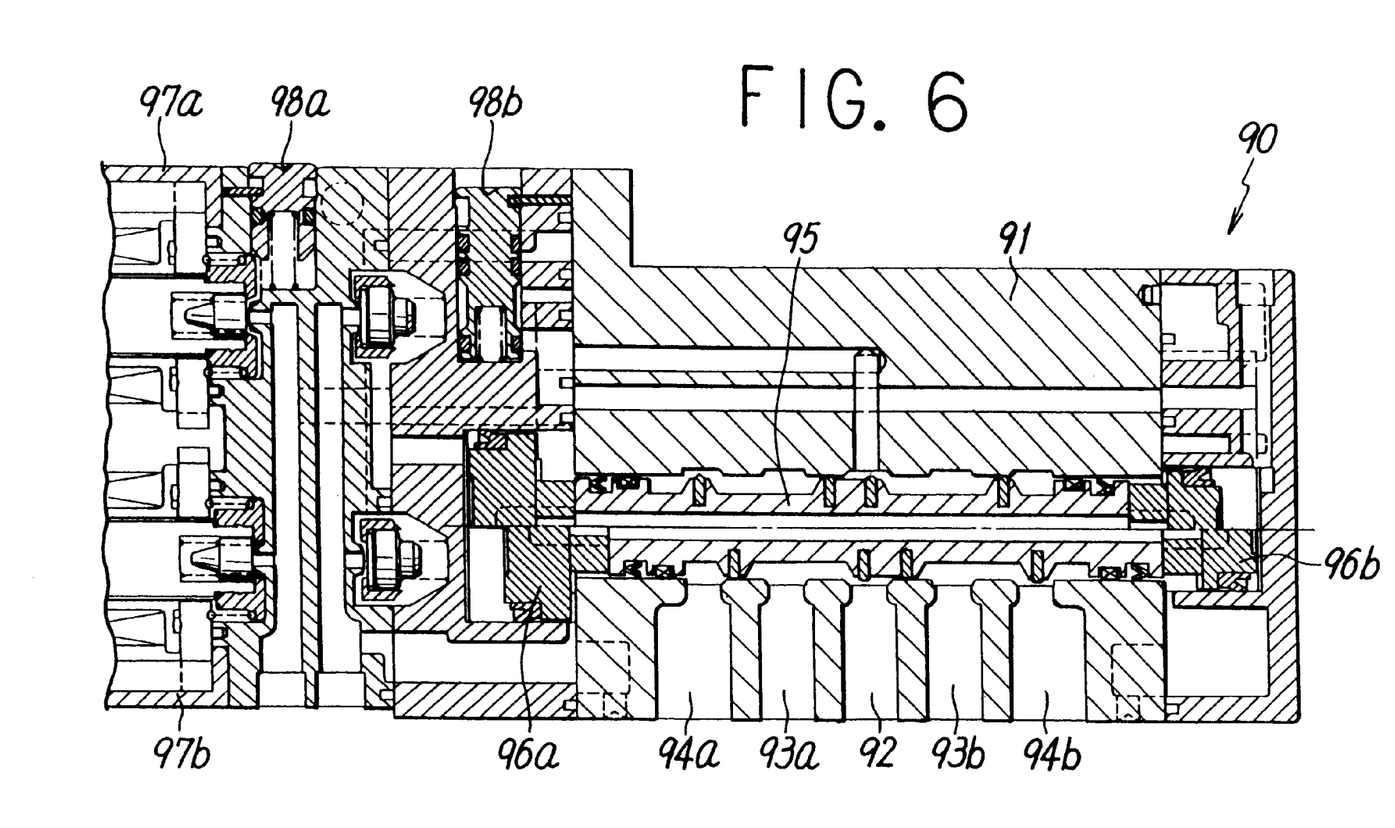
FIG. 6 is a sectional view showing an essential section of an exemplary pilot solenoid valve that can be switched between a single valve mode and a double valve mode.

More specifically, a valve body 91 of the pilot solenoid valve 90 shown in FIG. 6 is provided with a supply port 92, output ports 93*a* and 93*b*, and discharge ports 94*a* and 94*b*. Outer end surfaces of a first piston 96*a* and a second piston 96*b* disposed at both axial ends of a main valve body 95 are subjected to a fluid from the first pilot valve 97*a* or the second pilot valve 97*b* to drive the main valve body 95 to respective switching positions (indicated positions in an upper half and a lower half of the main valve body) to thereby constitute a five-port double valve. In this solenoid valve, the first piston 96*a* has a larger diameter than the second piston 96*b*, and manual switching devices 98*a* and 98*b* are provided that are capable of causing a pilot fluid pressure to act on the first piston and the second piston, respectively, independently of operations of the first pilot valve 97*a* and the second pilot valve 97*b*. The second manual switching device 98*b* can be locked in a pressed state, so that the solenoid valve is able to function as a single valve that uses only the first pilot valve 97*a* in a state wherein the pilot fluid pressure is applied to the outer end surface of the second piston 96*b*, the second manual switching device 98*b* being locked in the depressed state.

The details of the pilot solenoid valve 90 have been disclosed in Registered Utility Model Publication No. 2583766, etc.

Figure 7:
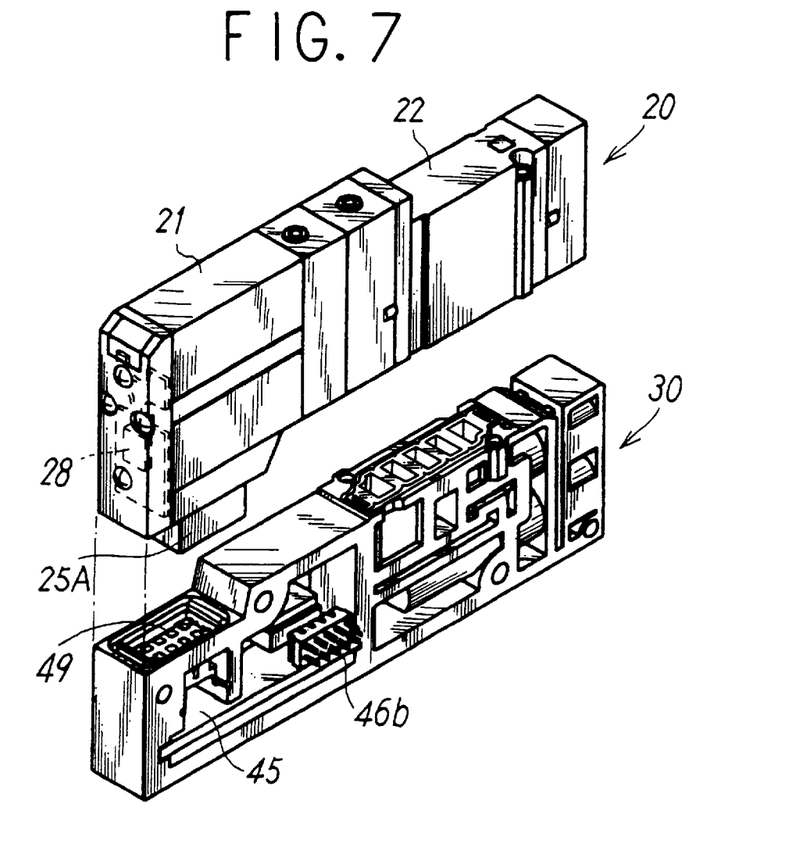
FIG. 7 is an assembly view a relational configuration of a manifold block and a solenoid valve that is different from the solenoid valve shown in FIG. 3.
Figure 8A:
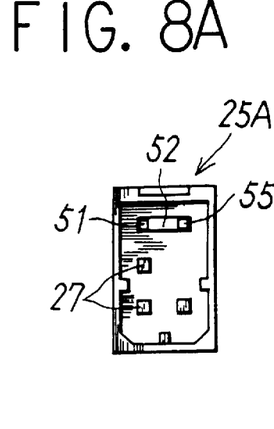
FIGS. 8A and 8B are front views of connectors in a single solenoid valve and a double solenoid valve.
Figure 8B:
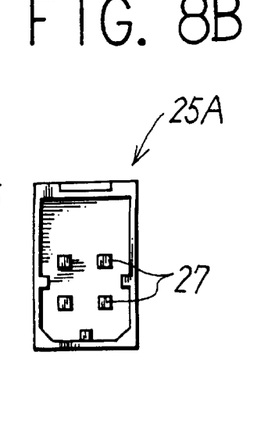

FIG. 7 and FIG. 8 show another exemplary configuration of the solenoid valve 20. This solenoid valve 20 is provided with the transmission and power supply connector 49 on the manifold block 30 and the slave chip 28 that extracts operation signals for the solenoid valve from received serial signals through a transmitting and power receiving connector 25A provided on the solenoid valve. To switch and set the slave chip 28 from the single valve mode to the double valve mode, connecting pins 27 mounted on the connector 25A provided on a single valve and the connector 25A provided on a double valve are formed to have a connecting configuration wherein serial signals are transmitted for single valves or double valves.

To be more specific, the transmitting and power receiving connector 25A for single valves may be configured, as shown in FIG. 8A, by coupling the switching terminal 51 to the ground terminal 55 by a short pin 52 and eliminating a terminal that is unnecessary for single valves, while the connector 25A for double valves may be configured, as shown in FIG. 8B, by eliminating a terminal or the connecting pins 27 that are unnecessary for double valves. The configurations of the connectors 25A, however, are not limited to the ones set forth above. Providing the connectors 25A for single valves and for double valves, respectively, makes it possible to switch the slave chip 28 used for both single valves and double valves to the single valve mode and the double valve mode. On the other hand, the same transmission and power supply connector 49 is used for single valves and double valves.

The remainder of the configuration and operation of the solenoid valve shown in FIG. 7 is the same as the solenoid valve described with reference to FIG. 2 and FIG. 3; therefore, like or equivalent components will be assigned like reference numerals, and the descriptions thereof will be omitted.

Figure 9:
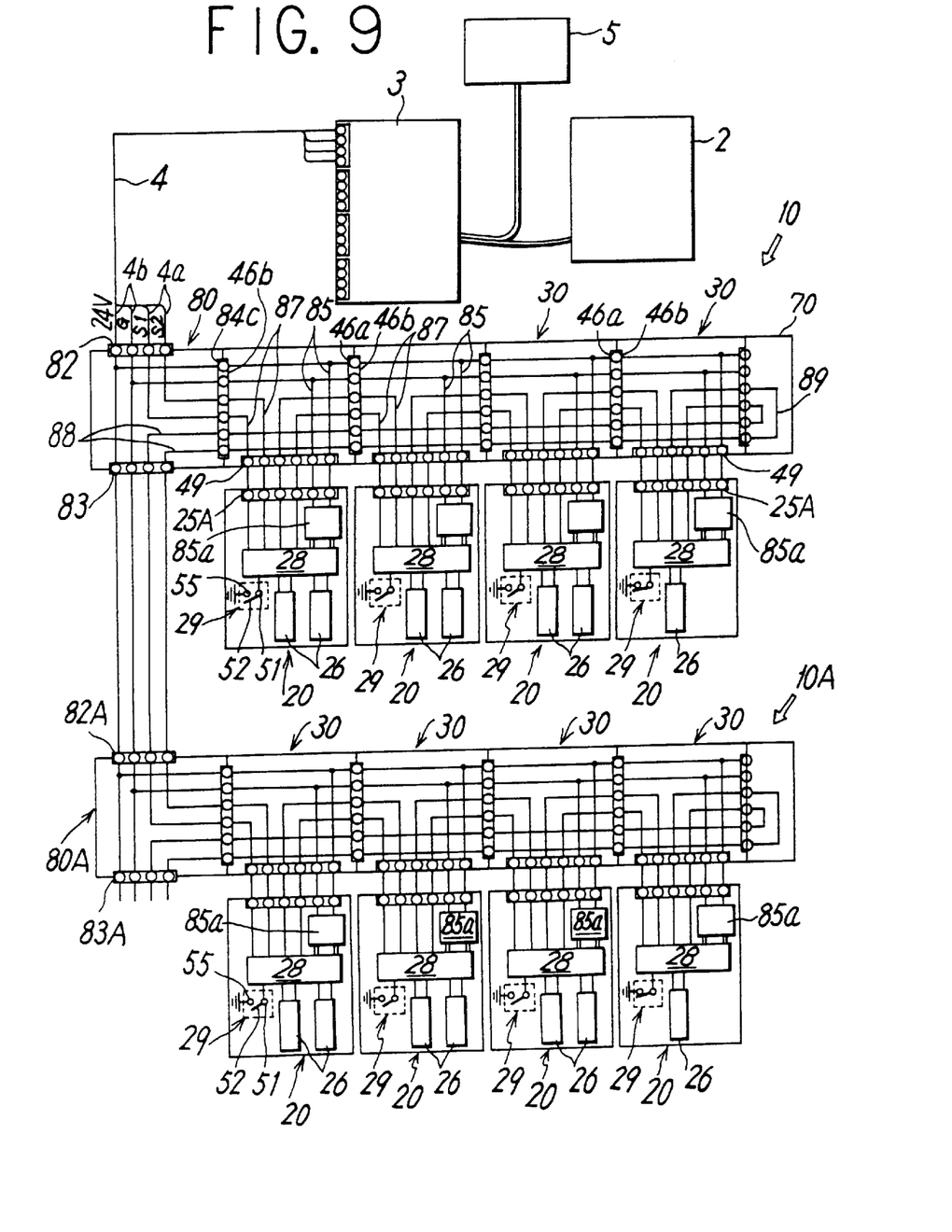
FIG. 9 is a schematic explanatory view showing an outline of signal lines in a relay unit and a manifold block in the control system of the manifold solenoid valve.

FIG. 9 schematically shows signal lines in the relay unit 80, the manifold blocks 30, and the solenoid valves 20 in the control system of the manifold solenoid valve 10. In the control system, as described in conjunction with FIG. 1 previously, serial signals and power signals are transmitted via the gateway 3 from the serial communication unit 2 and the power unit 5, and further transmitted via the receiving connecting terminal 82 to the relay unit 80 provided in the manifold solenoid valve 10 through the dedicated cable 4 comprised of a serial signal line 4*a* and a power signal line 4*b*. The drive power from the power unit 5 can alternatively be supplied separately from serial signals transmitted through the gateway 3. As necessary, a transmitting end of the relay unit 80 can be connected to a similar relay unit 80A of a manifold solenoid valves 10A or other analog equipment 7, etc. in succession via connecting terminals 83 and 82A, and their transmitting ends can be also connected to other equipment, etc. via the connecting terminal 83A.

Serial signals introduced into the relay unit 80 are transmitted from the female connecting terminal 84*c* provided therein to slave chips 28 accommodated in the solenoid valves 20, via the supply/exhaust block 60, which is omitted in FIG. 9, (see FIG. 1 and FIG. 2) and further via the male connecting terminal 46*b*, the transmission and power supply connector 49 of the manifold block 30 adjacent to the block 60, and the transmission and power receiving connector 25A of the solenoid valve 20. Operation outputs for supplying or cutting off power to the respective solenoid valves 20 are provided by switching operation of an output circuit based on serial signals in the respective slave chips 28, and the outputs are transmitted to the solenoids 26 of the respective solenoid valves 20. The serial signals are transmitted in sequence to the slave chips 28, which control the operations of the solenoid valves 20 in the following stage.

The solenoids 26 provided on the solenoid valves 20 function to operate pilot valves 21, among which only one solenoid 26 provided on the single solenoid valve 20 makes up a single valve (a three-port valve), while two solenoids 26 provided on the single solenoid valve 20 make up a double valve (a five-port valve).

Transmission lines 85 connected to the slave chips 28 are power lines for driving solenoid valves, transmission lines 85 are control power lines connected via 5V power sources 85*a*, transmission lines 87 are signal lines for transmitting serial signals S1 and S2, and transmission lines 88 are return signal lines for serial signals. Reference numeral 89 denotes a short-circuit line provided in the end block 70.

A control system in the manifold solenoid valve 10A connected via the connecting terminals 83 and 82A to the transmitting end of the relay unit 80 provided in the manifold solenoid valve 10 is substantially the same as the manifold solenoid valve 10. Hence, primary identical or equivalent parts will be assigned like reference numerals, and descriptions thereof will be omitted.

Depending on whether the solenoid valves 20, the drive of which is controlled by the slave chips 28, are the single valves or the double valves, the control system must be adapted accordingly. For example, the slave chips 28 are configured so that they can be switched between the single valve mode and the double valve mode by the changeover switches 29 described above with reference to FIG. 3, or the connectors 25A for single valves and double valves, respectively, are formed to have the connection structure for transmission in the single valve mode and the double valve mode as previously described with reference to FIG. 8, thus enabling the control system to be switched between the single valve mode and the double valve mode.

FIG. 9 schematically shows a structure wherein the slave chips 28 are switched between the single valve mode and the double valve mode by connecting or disconnecting the switching terminals 51 to or from the ground terminal 55 by a short pin 52. In the drawing, a state wherein the switching terminal 51 is connected to the ground terminal 55 by the short pin 52 is the single valve mode, while a state wherein the switching terminal 51 is released is the double valve mode.

Thus, by providing each solenoid valve 20 with the slave chip 28 constituting the control system for driving the solenoid valve 20, and by making the slave chip 28 switchable between the single valve mode and the double valve mode by means of the changeover switch 29 or the like attached thereto, it becomes possible to easily or automatically adapt the control system to single valves or double valves when assembling the manifold solenoid valve 10 and also to switch the control system that controls the solenoid valves to the single valve mode or the double valve mode in the same manner when changing any of the solenoid valves 20 mounted on the manifold blocks 30 from single valves to double valves, or vice versa.

Moreover, in the manifold solenoid valve 10 set forth above, the control system of the solenoid valve 20 is installed in each solenoid valve. Hence, the manifold solenoid valve 10 can be assembled with great ease, and a manifold solenoid valve that enables various types of maintenance to be implemented easily can be obtained.

According to the manifold solenoid valve driven by serial signals in accordance with the present invention described in detail above, in controlling the drive of the manifold solenoid valve by serial signals, both control systems for single valves and double valves can be configured by a switching operation in a single control system, and the solenoid valve itself is provided with a function for receiving serial signals for single valves or double valves. Hence, a manifold solenoid valve can be assembled with great ease, and when any of the solenoid valves mounted on manifold blocks are changed between single valves and double valves, the control systems of the solenoid valves can be easily switched.

In addition, common transmission circuits for serial signals, etc. in the manifold blocks are used regardless of whether the solenoid valves mounted on the manifold blocks are single valves or double valves, thus permitting easier assembly of a manifold solenoid valve and easier replacement of solenoid valves.

What is claimed is:

1. In a manifold solenoid valve that comprises a required number of solenoid valves and manifold blocks on which the solenoid valves are individually mounted and which are interconnected, supplies and exhausts compressed air to and from the respective solenoid valves through the manifold blocks, and transmits serial signals for operation control through the manifold blocks to control operations of the solenoid valves by the serial signals, a manifold solenoid valve driven by serial signals wherein;

female and male connecting terminals for transmitting serial signals to and from the manifold blocks consecutively connected are provided on each manifold block and projected to openings in top surfaces of the manifold blocks, and solenoid valves are provided with transmission and power supply connectors for transmitting serial signals for controlling the drive of the solenoids and for supplying drive power for switching a main valve;

transmission and power receiving connectors that are connected to the transmission and power supply connectors when the solenoid valves are mounted are provided at positions corresponding to the transmission and power supply connectors of the solenoid valves mounted on the manifold blocks, and the solenoid valves are provided with slave chips that extract operation signals for the solenoid valves from serial signals received through the connectors.

2. A manifold solenoid valve driven by serial signals according to claim 1, wherein;

a slave chip that can be switched and set between a single solenoid valve mode and a double solenoid valve mode is employed, and the solenoid valves are provided with changeover switches for switching and setting the solenoid valves.

3. A manifold solenoid valve driven by serial signals according to claim 1, wherein;

a slave chip that can be switched and set between a single solenoid valve mode and a double solenoid valve mode is employed, and connectors for single solenoid valves and double solenoid valves are formed to have a connection structure wherein serial signals are transmitted for single valves or double valves.

* * * * *